United States Patent
Yoshinari et al.

[11] Patent Number: 6,071,587
[45] Date of Patent: Jun. 6, 2000

[54] OPTICAL RECORDING MEDIUM AND ITS RECORDING METHOD

[75] Inventors: Jiro Yoshinari; Masanori Kosuda; Hiroshi Shingai; Hiroshi Chihara, all of Nagano, Japan

[73] Assignee: TDK Corporation, Tokyo, Japan

[21] Appl. No.: 09/163,604

[22] Filed: Sep. 30, 1998

[30] Foreign Application Priority Data

Oct. 1, 1997 [JP] Japan ................................. 9-284444
Dec. 18, 1997 [JP] Japan ................................. 9-364543

[51] Int. Cl.⁷ ..................................................... B32B 3/00
[52] U.S. Cl. ...................... 428/64.1; 428/64.4; 428/64.5; 428/698; 428/702; 428/913; 430/270.13; 430/495.1; 430/945; 369/283; 369/288
[58] Field of Search .................................. 428/64.1, 64.2, 428/64.4, 64.5, 457, 698, 702, 913; 430/270.13, 495.1, 945; 369/283, 288

[56] References Cited

U.S. PATENT DOCUMENTS 5,681,632 10/1997 Kitaura et al. ......................... 428/64.1
5,965,229 10/1999 Zhou et al. ............................ 428/64.4
5,978,349 11/1999 Yoshinari et al. .................... 369/275.1

FOREIGN PATENT DOCUMENTS 63-103453 5/1988 Japan.
2-64937 3/1990 Japan.
4-52188 2/1992 Japan.
6-195747 7/1994 Japan.

*Primary Examiner*—Elizabeth Evans
*Attorney, Agent, or Firm*—Oblon, Spivak, McClelland, Maier & Neustadt, P.C.

[57] ABSTRACT

An optical recording medium of phase change type which exhibits an increased number of overwritable operations is provided. The optical recording medium comprises a substrate, and a first dielectric layer, a recording layer, a second dielectric layer, and a metal reflective layer disposed on the substrate in this order, and the first dielectric layer comprises a dielectric layer 1*a* on the side of the substrate and a dielectric layer 1*b* in contact with the recording layer. The dielectric layer 1*a* comprises $ZnS—SiO_2$, and the dielectric layer 1*b* comprises $Si_3N_4$ and/or $Ge_3N_4$. The second dielectric layer may comprise a single layer of $ZnS—SiO_2$, $SiO_2$ or oxide of a rare earth metal. The second dielectric layer may also comprise a laminate of a dielectric layer 2*a* comprising $ZnS—SiO_2$ on the side of the substrate and a dielectric layer 2*b* comprising $SiO_2$ or oxide of a rare earth metal on the side of the reflective layer. The dielectric layer 1*b* has a thickness of 0.5 to 40 nm, and ratio of thickness of the dielectric layer 1*b* to the thickness of the first dielectric layer is up to 0.5.

12 Claims, 2 Drawing Sheets

OPTICAL RECORDING MEDIUM AND ITS RECORDING METHOD

BACKGROUND OF THE INVENTION

1. Field of the Invention

This invention relates to a phase change optical recording medium, and a method for overwriting such medium.

2. Prior Art

Highlight is recently focused on optical recording media capable of recording information at a high density and erasing the recorded information for overwriting. One typical rewritable (or erasable) optical recording medium is of the phase change type wherein a laser beam is directed to the recording layer to change its crystalline state whereupon a change of reflectance by the crystallographic change is detected for reproduction of the information. The phase change optical recording media are of great interest since the optical system of the drive unit used for their operation is simple as compared with magneto-optical recording media.

Most optical recording media of phase change type used chalcogenide systems such as Ge—Sb—Te systems which provide a substantial difference in reflectance between crystalline and amorphous states and have a relatively stable amorphous state.

When information is recorded in the optical recording medium of phase change type, the laser beam applied is of high power (recording power) that the recording layer is heated to a temperature higher than the melting point. In the region where the recording power is applied, the recording layer is melted and thereafter quenched to form an amorphous record mark. When the record mark is erased, a laser beam of relatively low power (erasing power) is applied so that the recording layer is heated to a temperature higher than the crystallizing temperature and lower than the melting temperature. The record mark to which the laser beam of erasing power is applied is heated to a temperature higher than the crystallizing temperature and then allowed to slowly cool to recover the crystalline state. Accordingly, in the optical recording media of the phase change type, the medium can be overwritten by modulating the intensity of a single light beam.

In the optical recording medium of phase change type, dielectric layers are generally formed on opposite sides of the recording layer. Requirements for the dielectric layers are:

(1) the dielectric layers should be capable of protecting the recording layer and the substrate from heat histerisis as a result of the laser beam irradiation;

(2) the dielectric layers should be capable of amplifying the reproduced signal by making use of optical interference effect of the lights reflected from boundaries between the layers; and (3) the recording and erasing properties can be regulated by adjusting thermal conductivity and the like of each dielectric layer.

Typical dielectric layers which meet such requirements are those containing highly refractive ZnS as their main component. For example, Japanese Patent Application Kokai (JP-A) No. 103453/1988 discloses an optical information recording member having a dielectric layer containing a mixture of ZnS and $SiO_2$. The merits described therein include increase in sensitivity for the power of incident light upon recording, and increase in the number of erasing/overwriting operations of the dielectric material. The increase in the sensitivity is said to have been realized by optimizing thermal constant of the dielectric layer, and the increase in the number of erasing/overwriting operations is said to have been realized by preventing the alteration in the nature of the dielectric layer. JP-A 103453/1988 discloses that $SiO_2/(ZnS+SiO_2)$ is preferably in the range of 10 to 30 mol % since the laser energy required for the recording and the erasure is minimum when $SiO_2/(ZnS+SiO_2)$ is in such range.

However, in the optical recording medium of phase change type wherein the recording layer comprising Ge—Sb—Te based material or the like is sandwiched by dielectric layers containing ZnS as their main component, C/N reduces with the repeated overwriting operations, and the medium becomes unoverwritable after approximately several thousand times. A major cause for the decrease in C/N with the repeated overwriting operations is believed to be influence of the alteration in the composition of the recording layer due to element diffusion between the adjacent dielectric layer.

JP-A 64937/1990 describes improvement of adaptability to repeated recording operations by providing a heat-resistant protective layer on one surface or both surfaces of the recording medium, and a protective layer having a bulk modulus smaller than that of the heat-resistant protective layer on at least one surface of the heat resistant protective layer. The exemplary materials disclosed therein for constituting the protective layer of smaller bulk modulus are $MoS_2$, ZnS, ZnSe and the like, and the exemplary materials disclosed therein for constituting the heat-resistant protective layer are silicon carbide, silicon nitride, and aluminum oxide. In Example 2 of JP-A 64937/1990, $SiN_x$ layers of 20 nm are formed on opposite sides of the recording layer, and a ZnS layer of 100 nm is formed on the $SiN_x$ layer on the side of the laser beam incidence and a ZnS layer of 200 nm is formed on the $SiN_x$ layer on the other side. There is described that the medium of such constitution exhibited good adaptability to repeated recording operations of several ten thousand times.

However, when the inventors of the present invention evaluated the medium of the layer constitution as described in the example of JP-A 64937/1990, the number of overwritable operations was only about 10,000.

SUMMARY OF THE INVENTION

In view of the situation as described above, an object of the present invention is to increase the number of overwritable operations of the optical recording medium of phase change type which has a dielectric layer containing zinc sulfide and silicon oxide as its main components at least on the substrate side of the recording layer.

The objects as described above are realized by the optical recording medium and the production method thereof as described below in (1) to (7).

(1) An optical recording medium having a substrate and a recording layer of phase change type wherein the recording layer has a first dielectric layer and a second dielectric layer disposed on opposite sides thereof and in contact therewith, and wherein a reflective layer comprising a metal is disposed on the second dielectric layer, wherein the first dielectric layer comprises a dielectric layer 1a on the side of the substrate and a dielectric layer 1b on the side of the recording layer, and the dielectric layer 1a contains zinc sulfide and silicon oxide as its main components and the dielectric layer 1b contains silicon nitride and/or germanium nitride as its main component(s);

the second dielectric layer contains zinc sulfide and silicon oxide; silicon oxide; or oxide of a rare earth metal as its main component(s); and the dielectric layer 1b has a thickness of 0.5 to 40 nm, and ratio ($t_{1b}/t_1$) of thickness ($t_{1b}$) of the dielectric layer 1b to the thickness ($t_1$) of the first dielectric layer is up to 0.5.

(2) An optical recording medium having a substrate and a recording layer of phase change type wherein the recording layer has a first dielectric layer and a second dielectric layer disposed on opposite sides thereof and in contact therewith, and wherein a reflective layer comprising a metal is disposed on the second dielectric layer, wherein the first dielectric layer comprises a dielectric layer 1a on the side of the substrate and a dielectric layer 1b on the side of the recording layer, and the dielectric layer 1a contains zinc sulfide and silicon oxide as its main components and the dielectric layer 1b contains silicon nitride and/or germanium nitride as its main component(s);

the second dielectric layer comprises a dielectric layer 2a on the side of the recording layer and a dielectric layer 2b on the side of the reflective layer, and the dielectric layer 2a contains zinc sulfide and silicon oxide as its main components and the dielectric layer 2b contains silicon oxide or oxide of a rare earth metal as its main component; and the dielectric layer 1b has a thickness of 0.5 to 40 nm, and ratio ($t_{1b}/t_1$) of thickness ($t_{1b}$) of the dielectric layer 1b to the thickness ($t_1$) of the first dielectric layer is up to 0.5.

(3) The optical recording medium of the above (1) or (2) wherein the dielectric layer 1b contains silicon nitride as its main component, and the dielectric layer 1b has a thickness of less than 5 nm.

(4) The optical recording medium of the above (1) or (2) wherein the dielectric layer 1a has silicon oxide content in the range of from 2 mol % to less than 40 mol % (excluding 40 mol %) when the silicon oxide content [$SiO_2/(ZnS+SiO_2)$] is determined by calculating the zinc sulfide and the silicon oxide in terms of ZnS and $SiO_2$, respectively.

(5) The optical recording medium of the above (1) or (2) wherein the recording layer contains Ge, Sb and Te as its main components.

(6) The optical recording medium of the above (1) or (2) wherein the recording layer has an average crystal grain size of 20 to 150 nm.

(7) A method for overwriting the optical recording medium of any one of the above (1) to (6) wherein the medium is overwritten with a laser beam modulated in three power levels of $P_P$ (peak power); $P_{B1}$ (bias power 1) lower than the $P_P$; and $P_{B2}$ (bias power 2) lower than the $P_{B1}$; and the laser beam for the record mark formation is pulse modulated such that the peak power is $P_P$ and the bottom power is $P_{B2}$, and the power level is reduced to $P_{B2}$ after the irradiation of the last pulse and increased to the erasing power level of $P_{B1}$.

DETAILED DESCRIPTION OF THE INVENTION

Figure 1:
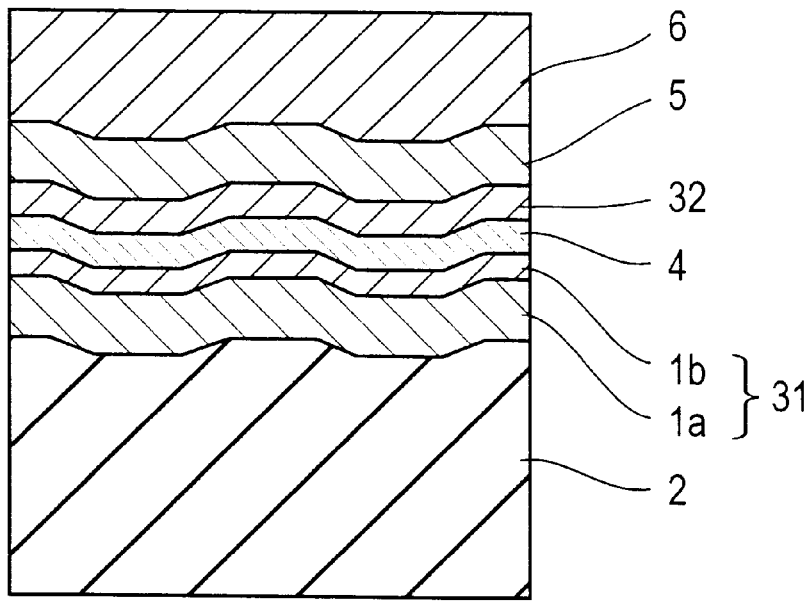
FIG. 1 is a partial cross-sectional view of an embodiment of the optical recording medium according to the present invention.

As shown in FIG. 1, the optical recording medium of the present invention comprises a substrate 2, and a first dielectric layer 31, a recording layer 4 of phase change type, a dielectric layer 32, and a reflective layer 5 comprising a metal disposed on the substrate 2 in this order, and the first dielectric layer 31 comprises a dielectric layer 1a on the side of the substrate 2 and a dielectric layer 1b on the side of the recording layer 4.

The dielectric layer 1a contains zinc sulfide and silicon oxide as its main components and the dielectric layer 1b contains silicon nitride and/or germanium nitride as its main component(s), and the dielectric layer 1b is deposited to the thickness as mentioned above. Increase in jitter by repeated overwriting operations can be suppressed by such constitution, and the number of overwritable operations (number of overwritable operations until the jitter exceeds 13%) is sufficiently increased. The reason for such increase in the number of overwritable operations is not clear. However, it is estimated that the provision of the dielectric layer 1b between the dielectric layer 1a and the recording layer 4 prevents alteration of the composition of the recording layer 4 by the diffusion of Zn and S from the dielectric layer 1a.

In the medium of the structure shown in FIG. 1, the second dielectric layer is in the path of heat dissipation from the recording layer. Since the heat passing through the second dielectric layer is quickly dissipated from the reflective layer, temperature elevation of the second dielectric layer is smaller than that of the first dielectric layer. Accordingly, heat resistance required for the second dielectric layer is not as severe as the first dielectric layer, and instead, the second dielectric layer is required to have higher resistance to exfoliation in their boundary with the reflective layer and the recording layer as well as improved heat conduction. When the main component of the second dielectric layer comprises a mixture of zinc sulfide and silicon oxide, the second dielectric layer enjoys the high resistance to exfoliation owing to the low bulk modulus of such mixture. The mixture of zinc sulfide and silicon oxide also has a low heat conduction, and the second dielectric layer may have a reduced thickness. However, in an occation when the recording should be accomplished at a high power, the temperature of the second dielectric layer is inevitably elevated, and zinc and sulfur diffusion from the second dielectric layer to the recording layer is likely to occur. In view of such situation, silicon oxide or oxide of a rare earth metal may be used as the main component of the second dielectric layer as desired. The layer of silicon oxide or oxide of a rare earth metal will play the role of a barrier against the zinc and sulfur diffusion, and therefore, use of such layer is effective when recording at a high power is required.

Figure 2:
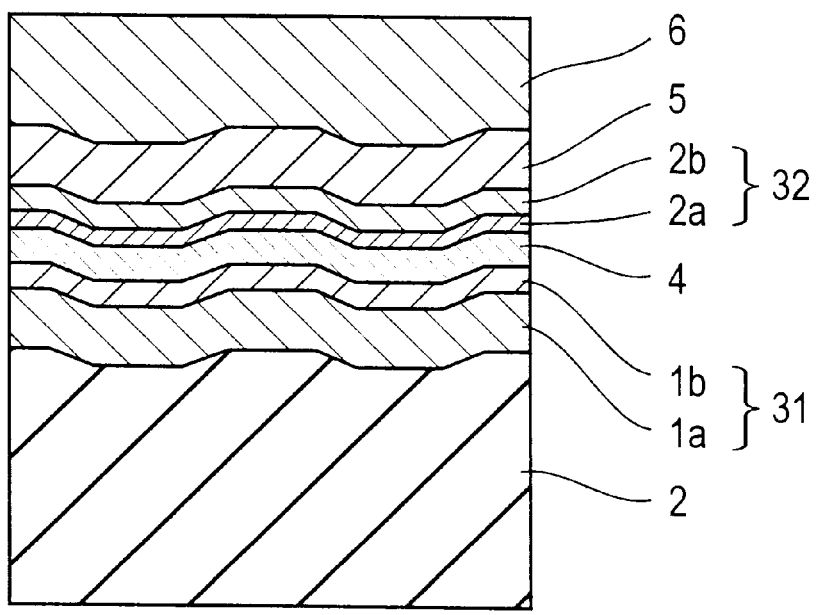
FIG. 2 is a partial cross-sectional view of another embodiment of the optical recording medium according to the present invention.

However, when the layer of silicon oxide or oxide of a rare earth metal is formed in contact with the recording layer, the recording layer will exhibit a higher crystallization rate. Therefore, when there is a need for reducing the crystallization rate, a second dielectric layer of dual layer structure may be employed as shown in FIG. 2, and in such case, a dielectric layer 2a comprising a mixture of zinc sulfide and silicon oxide may be formed between the dielectric layer 2b of silicon oxide or oxide of a rare earth metal and the recording layer 4. The crystallization rate of the recording layer is suppressed by such constitution. It should be also noted that the dielectric layer 2a in such constitution will fully play its role even if the layer was quite thin, and therefore, provision of such dielectric layer 2a has no adverse effects (such as zinc and sulfur diffusion) on the recording layer.

When the recording medium was prepared in accordance with the example of JP-A 64937/1990, supra, by forming $SiN_x$ layers on opposite sides of the recording layer and evaluated, the number of overwritable operations remained around ten thousand times, which is inferior to the result of the present invention. Although the reason is unclear, it is estimated that the large stress that occurs in the $SiN_x$ layers on opposite sides of the recording layer results in deteriorated mechanical properties of the boundary between the $SiN_x$ layers and the adjacent layers, inviting exfoliation. In the study of the inventors of the present invention, it has been found that the $SiN_x$ layer between the substrate and the recording layer undergoes exfoliation during high temperature, high humidity storage when the $SiN_x$ layer is too thick.

JP-A 195747/1994 discloses an optical disc wherein a $ZnS-SiO_2$ layer, an $Si_3N_4$ layer, a recording layer, a $ZnS-SiO_2$ layer, and a reflective layer are formed on the substrate in this order. This optical disc shares a common feature with the optical recording medium of the present invention that an $Si_3N_4$ layer is formed between the recording layer and the $ZnS-SiO_2$ layer on the side of the substrate.

The object of the invention described in JP-A 195747/1994, however, is prevention of decrease in the degree of erasure when used with a short wavelength light source or under high speed disc rotation, and this object is different from the object of the present invention. In JP-A 195747/1994, the $Si_3N_4$ layer is used as a layer for promoting the crystallization of the recording layer. In the investigation by the inventors of the present invention, the preferable thickness of the $Si_3N_4$ layer used for the purpose of promoting the crystallization of the recording layer is thicker than the thickness of the dielectric layer 1b defined in the present invention. Therefore, when the $Si_3N_4$ layer is formed to a thickness capable of attaining the object described in JP-A 195747/1994, the merit of the present invention, namely, increase in the number of overwritable operations will be insufficient. When the $Si_3N_4$ layer corresponding to the dielectric layer 1b of the present invention is too thick, the $ZnS-SiO_2$ layer between the $Si_3N_4$ layer and the substrate will be relatively thin, and it will be difficult to attain the high C/N. When the $Si_3N_4$ layer corresponding to the dielectric layer 1b of the present invention is too thick, exfoliation between the layers will also take place in the case of high temperature, high humidity environment. It should be noted that JP-A 195747/1994 is utterly silent about the thickness of the $Si_3N_4$ layer, or use of germanium nitride instead of the $Si_3N_4$.

JP-A 52188/1992 discloses an optical recording medium of phase change type wherein a transparent substrate, a first protective layer, a recording thin film, a second protective layer, and a reflective layer are formed in this order. This medium shares common features with the optical recording medium of the present invention that the recording thin film comprises Te—Ge—Sb, a nitride layer comprising GeN is formed on at least one side of the recording thin film, and the first and the second protective layers comprise $ZnS-SiO_2$.

The object of the invention described in JP-A 52188/1992, however, is to melt the nitride layer for its mixing with the recording thin film to thereby supply nitrogen to the recording thin film during the initiallization carried out for crystallization of the entire surface of the recording thin film. Nitrogen is supplied to the recording thin film to thereby prevent movement of the material constituting the recording thin film along the guide groove of the substrate by the pulsatic movement of the protective layer associated with the repeated recording and erasure. Accordingly, when the medium described in JP-A 52188/1992 is recorded and erased after the initiallization, the nitride layer is either absent, or if present, has undergone a drastic change in its composition, and such layer is no longer capable of achieving the function equivalent to the dielectric layer 1b of the present invention, namely, the function as a barrier layer for the diffusion of zinc and sulfur. The recording thin film that has been initialized by melting comprises coarse crystal grains having diameters in excess of 150 nm, and the grain size gradually decreases with the repeated recording and erasure. In other words, the repeated recording and erasure invite atom movement, and hence, segregation within the recording thin film to detract from stable performance. In contrast, in the present invention, the recording layer is crystallized in solid phase in the initialization, and therefore, the dielectric layer 1b does not loose the function as the barrier layer. The average crystal grain size after the solid phase initialization is approximately 20 to 150 nm, which is close to the crystal grain size after repeated recording and erasure, and this enables stable recording and erasure. In addition, the optical recording medium actually produced in the example of JP-A 52188/1992 is different from that of the present invention in that the nitride layer is formed between the recording thin film and the second protective layer, and therefore, the merit of the present invention will not be realized even if the nitride layer remained after the initialization by melting.

PREFERRED EMBODIMENTS OF THE INVENTION

Next, the present invention is described in further detail by referring to the preferred embodiments of the invention.

Exemplary embodiments of the optical recording medium of the present invention are shown in FIGS. 1 and 2. These optical recording media are single side (single substrate) optical recording media which comprise a first dielectric layer 31, a recording layer 4, a second dielectric layer 32, a reflective layer 5, and a protective layer 6 on a substrate 2 formed in this order. The present invention is also applicable for a double side recording medium comprising two single side recording media which are adhered to each other by an intervening adhesive layer such that the protective layer 6 is located in the interior side of the resulting medium. The present invention is also applicable for a medium comprising the single side recording medium as described above adhered to a protective substrate by an intervening adhesive layer.

Substrate

In the optical recording medium of the present invention, the recording layer 4 is irradiated with the light beam from the side of the substrate 2, and therefore, the substrate 2 is preferably formed of a material substantially transparent to the light beam employed, for example, resins or glass. Typical such resins include acrylic resins, polycarbonate, epoxy resins and polyolefins. The shape and dimensions of the substrate are not critical although it is generally of disc shape having a thickness of about 0.5 to 3 mm and a diameter of about 50 to 360 mm. The substrate may be provided on its surface with a predetermined pattern of grooves for tracking and addressing purposes.

The optical recording medium of the present invention is adapted for use in high density recording, and in particular, for the system wherein both the land and the groove are used for the recording tracks (land/groove recording). In such a case, typical recording track pitch is preferably in the range of about 0.3 to 1.0 μm.

First Dielectric Layer 31 and Second Dielectric Layer 32

The first dielectric layer 31 plays the role of preventing oxidation of the recording layer and protecting the substrate by shutting off the heat which can otherwise conduct from the recording layer to the substrate upon recording. The second dielectric layer 32 plays the role of protecting the recording layer and helps the heat remaining in the recording layer after completion of recording release through heat transfer. Further, the provision of both the dielectric layers is effective for improving a degree of modulation.

The first dielectric layer 31 comprises a dielectric layer 1a on the side of the substrate 2 and a dielectric layer 1b on the side of the recording layer 4. The dielectric layer 1a contains zinc sulfide and silicon oxide as its main components. The silicon oxide content of the dielectric layer 1a is in the range of 2 mol % to less than 40 mol % (not including 40 mol %), and preferably, 10 to 30 mol %. When the silicon oxide content of the dielectric layer 1a is too high, refractive index will be to small to realize high C/N ratio. When the silicon oxide content is too low, the number of overwritable operations will be reduced. The dielectric layer 1a may be either of homogeneous composition or of composition gradient structure in which the silicon oxide content varies incrementally or continuously.

The dielectric layer 1b may contain silicon nitride and/or germanium nitride as its main components, and more preferably, the dielectric layer 1b comprises silicon nitride or germanium nitride, and most preferably germanium nitride. The composition of the silicon nitride contained in the dielectric layer 1b is not particularly limited, and exemplary composition is $Si_xN_{1-x}$ (wherein x is in the range of 0.35 to 0.55). The composition of the silicon nitride contained in the dielectric layer 1b is also not particularly limited, and exemplary composition is $Ge_xN_{1-x}$ (wherein x is in the range of 0.35 to 0.55).

The second dielectric layer 32 may be either of single layer structure (see FIG. 1) or of laminate structure (see FIG. 2) as described above. When the second dielectric layer 32 is of single layer structure, the second dielectric layer may preferably contains zinc sulfide and silicon oxide; silicon oxide; or oxide of a rare earth metal as its main component (s). When the second dielectric layer 32 is of laminate structure, the second dielectric layer is preferably constituted from two dielectric layers 2a and 2b, namely, dielectric layer 2a comprising zinc sulfide and silicon oxide as its main components on the side of the recording layer 4, and dielectric layer 2b comprising silicon oxide or oxide of a rare earth metal as its main component on the side of the reflective layer 5.

When the second dielectric layer 32 is of single layer structure containing zinc sulfide and silicon oxide as its main components, the silicon oxide content is preferably at least 2 mol %, and more preferably at least at least 40 mol %. When the silicon oxide content of the second dielectric layer 32 is too low, influence of the zinc and sulfur diffusion from the second dielectric layer 32 to the recording layer 4 will be significant.

When the second dielectric layer 32 is of dual layer structure and a dielectric layer 2a containing zinc sulfide and silicon oxide as its main components is provided, the dielectric layer 2a may preferably have a silicon oxide content of 5 to 60 mol %. When the silicon oxide content of the dielectric layer 2a is too low, influence of the zinc and sulfur diffusion will be significant. When the silicon oxide content of the dielectric layer 2a is too high, merit of providing the dielectric layer 2a will not be sufficiently realized.

The rare earth metal element which may be employed in the second dielectric layer 32 is not limited to any particular type, and at least one rare earth metal element selected from Ce, La, Y, Pr, Nd, Pm, Sm, Eu, Gd, Tb, Dy, Ho, Er, Tm, Yb, Lu and the like may be employed. The rare earth metal element is preferably at least one of Ce, La and Y.

It should be noted that the above-described silicon oxide content which should be fulfilled by each of the dielectric layers should be fulfilled not only as the average of each layer, and every part of the layer should be within such range.

The content of the silicon oxide used in the present invention is the value determined by $SiO_2/(ZnS+SiO_2)$ when the zinc sulfide and the silicon oxide are calculated in terms of ZnS and $SiO_2$, respectively, that is, after determining the amount of sulfur, zinc and silicon by fluorescent X-ray analysis. It should be noted that, when excessive zinc is present in relation to sulfur, or excessive sulfur is present in relation to zinc, the excessive zinc or sulfur is assumed to be present in the form of other compounds (such as ZnO or the like) or in free form, and the smaller one of the zinc content and the sulfur content is used in the determination of the ZnS content.

The first dielectric layer 31 is preferably 30 to 300 nm thick, and more preferably, 50 to 250 nm thick. When the first dielectric layer has such thickness, the damage to the substrate upon recording can be effectively prevented and higher degree of modulation is available.

The dielectric layer 1b may preferably have a thickness of 0.5 to 40 nm, and more preferably, 0.8 to 30 nm. However, it should be noted that the thickness of the dielectric layer 1b is preferably limited to less than 5 nm, and in particular, to 4 nm or less when the dielectric layer 1b is formed from silicon nitride in order to prevent the exfoliation under high temperature, high humidity conditions. On the other hand, when the dielectric layer 1b is formed from germanium nitride, the layer is preferably deposited to a thickness of 5 to 40 nm, and more preferably to 5 to 30 nm for the purpose of improving the barrier properties since the layer comprising germanium nitride is resistant to exfoliation under high temperature, high humidity conditions. Improvement in the number of overwritable operations will be insufficient when the dielectric layer 1b is excessively thin or thick.

The ratio $(t_{1b}/t_1)$ of the thickness of the dielectric layer 1b $(t_{1b})$ to the thickness of the first dielectric layer $(t_1)$ is preferably up to 0.5, and more preferably, up to 0.4. Even if the thickness of the dielectric layer 1b were within the above-specified preferable range, the number of overwritable operations will not be sufficiently improved when the ratio $t_{1b}/t_1$ is to large.

The second dielectric layer 32 is preferably 10 to 50 nm thick, and more preferably, about 13 to 35 nm thick. This thickness range ensures a fast cooling rate and thus permits to define a record mark with a clear edge, resulting in reduced jitter. Also higher degree of modulation is available.

When the second dielectric layer 32 comprises two layers, the dielectric layer 2a may preferably have a thickness of 2 to 15 nm, and more preferably, 3 to 10 nm. When the dielectric layer 2a is too thin, the merit of providing the dielectric layer 2a is not sufficiently realized. On the other hand, when the dielectric layer 2a is too thick, influence of the zinc and sulfur dispersion of from the dielectric layer 2a to the recording layer 4 will be increased in the recording at a high power. It should be noted that the ratio ($t_{2b}/t_2$) of the thickness of the dielectric layer 2b ($t_{2b}$) to the thickness of the second dielectric layer ($t_2$) is preferably up to about 0.5.

The dielectric layer containing zinc sulfide may preferably contain an element whose standard free energy of sulfide formation is lower than the standard free energy of ZnS formation at 0 to 1000° C. (hereinafter referred to as metal element A). Incorporation of the metal element A in the dielectric layer results in the suppressed release of sulfur and zinc upon repeated overwriting, and increase of jitter is thereby prevented. This results in the increased number of overwritable operations.

The metal element A is preferably at least one member selected from Ce, Ca, Mg, Sr, Ba and Na, and use of Ce is most preferable in view of the low standard free energy of sulfide formation. For example, at 300K, the standard free energy of ZnS formation is about −230 kJ/mol, the standard free energy of CeS formation is about −540 kJ/mol, the standard free energy of CaS formation is about −510 kJ/mol, the standard free energy of MgS formation is about −390 kJ/mol, the standard free energy of SrS formation is about −500 kJ/mol, the standard free energy of BaS formation is about −460 kJ/mol, and the standard free energy of $Na_2S$ formation is about −400 kJ/mol.

In the ZnS-containing dielectric layer, the ratio of the metal element A to the total metal elements is less than 2 at %, preferably 1.5 at % or less, and more preferably 1.3 at % or less. When the ratio of the metal element A is in excess of such range, the effect of suppressing jitter increase upon repeated overwriting is not realized. It should be noted that the ratio of the metal element A is preferably at least 0.01 at %, and more preferably at least 0.03 at % for sufficient realization of the metal element A addition. The ratio of the metal element A to the total metal elements may be determined by fluorescent X-ray analysis or EPMA (electron probe X-ray microanalysis). It should be noted that semimetal such as silicon is included in the "total metal elements" in the dielectric layer.

The metal element A in the dielectric layer may take form of simple substance, sulfide, oxide, fluoride, or the like.

The dielectric layers are preferably formed by vapor deposition such as sputtering and evaporation, and in particular, by sputtering. The dielectric layer 1b may be formed, for example, by the sputtering wherein silicon nitride or germanium nitride is used for the target, or by the reactive sputtering wherein the sputtering is effected in a nitrogen-containing argon atmosphere by using a target comprising Ge or Si.

When the dielectric layer of composition gradient structure is formed by sputtering, the dielectric layer may be formed, for example, by simultaneous sputtering utilizing two or more targets and the ratio of the power applied to each target may be incrementally or continuously altered from the initial stage to the terminal stage of the film deposition.

The metal element A may be incorporated in the dielectric layer by various methods. For example, when the metal element A is cerium, a chip comprising cerium as simple substance or $CeO_2$ may be placed on the main target comprising the main components of the dielectric layer, or alternatively, cerium may be incorporated in the main target in the form of $CeO_2$ or other Ce compounds. When calcium or magnesium is used for the metal element A, it is possible to place a chip comprising CaO or MgO. Such oxides, however, have deliquescence, and use of such chip is undesirable. In such a case, a chip comprising $CaF_2$ or $MgF_2$ may be placed on the main target. The situation is similar when strontium, barium, sodium and the like are used for the metal element A, and use of fluoride chip is more preferable than oxide chip in view of the deliquescence. Alternatively, calcium, magnesium, strontium, barium, and sodium may be incorporated in the main target in the form of oxide or other compounds. The main target may comprise a multi-component target such as $ZnS-SiO_2$, or alternatively, ZnS and SiO2 may be separately used for the main targets in simultaneous sputtering.

The sputtering is generally conducted in argon atmosphere. However, when the metal element A as described above is incorporated in the dielectric layer, the sputtering is preferably effected in a mixed atmosphere of argon and oxygen. Introduction of the oxygen into the sputtering atmosphere is particularly effective when the sputtering is conducted by placing the chip comprising the metal element A as simple substance on the main target, but such oxygen introduction is also effective when the sputtering is conducted by placing the chip comprising the compound of the metal element A on the main target or by incorporating the compound of the metal element A in the main target. The amount of oxygen introduced into the sputtering atmosphere in terms of flow rate ratio $O_2/(Ar+O_2)$ is preferably 30% or less, and more preferably 25% or less. Excessive introduction of the oxygen is undesirable since the recording power decreases with no difference in the erasing power, and the erasing power margin will be extremely narrow. The oxygen is preferably introduced to a flow rate ratio of 5% or higher, and more preferably, to a flow rate ratio of 10% or higher in order to fully enjoy the effects of oxygen introduction.

Recording layer 4

The composition of the recording layer is not particularly limited since the merits of the present invention are realized irrespective of the composition of the recording layer as long as the recording medium is of phase change type wherein the dielectric layer is heated to an elevated temperature in the recording. However, the present invention is particularly effective when the optical recording medium has a recording layer of Ge—Sb—Te based system or In—Ag—Te—Sb based system, and in particular, Ge—Sb—Te based system.

In the recording layer of germanium (Ge)-antimony (Sb)-tellurium (Te) system, the atomic ratio of germanium, antimony and tellurium is preferably represented by the formula (I):

$$Ge_aSb_bTe_{1-a-b} \tag{I}$$

wherein letters a and b are respectively in the range: $0.08 \leq a \leq 0.25$ and $0.20 \leq b \leq 0.40$.

If the value of a is too small in formula (I), record marks are more unlikely to crystallize and the erasability would be lower. If the value of a is too large, much tellurium would bond with germanium with the resultant precipitation of antimony, inhibiting formation of record marks.

If the value of b is too small, the content of tellurium would be too much and record marks are more likely to crystallize when the medium is stored at elevated temperature with a loss of reliability. If the value of b is too large, antimony would precipitate to inhibit formation of record marks.

The recording layer of this composition system preferably has a thickness of about 10 to 50 nm, more preferably 14 to 50 nm. A too thin recording layer would restrain the growth of a crystalline phase and provide an insufficient change of reflectivity associated with a phase change. A too thick recording layer would provide a lower reflectivity and a lower degree of modulation.

In the recording layer of indium (In)-silver (Ag)-tellurium (Te)-antimony (Sb) system, the atomic ratio of indium, silver, tellurium, and antimony is preferably represented by the formula (II):

$$\{(In_a Ag_b Te_{1-a-b})_{1-c} Sb_c\}_{1-d} M_d \qquad (II)$$

wherein letters a, b, c and d are in the range: $0.1 \leq a \leq 0.3$, $0.1 \leq b \leq 0.3$, $0.5 \leq c \leq 0.8$, and $0 \leq d \leq 0.10$, more preferably in the range: $0.11 \leq a \leq 0.28$, $0.15 \leq b \leq 0.28$, $0.55 \leq c \leq 0.78$, and $0.005 \leq d \leq 0.05$.

If the value of a is too small in formula (II), the indium content of the recording layer will be relatively too low and record marks will become less amorphous, resulting in a lower degree of modulation and lower reliability. If the value of a is too large, the indium content of the recording layer will be relatively too high and the reflectivity of regions other than record marks will become low, resulting in a lower degree of modulation.

If the value of b is too small in formula (II), the silver content of the recording layer will be relatively too low and the recrystallization of record marks and hence, repetitive overwriting will become difficult. If the value of b is too large, the silver content of the recording layer will be relatively too high and excess silver will solely diffuse into the antimony phase during the recording and erasure. This results in lower rewriting durability, less stability of both the record marks and the crystalline regions, and a loss of reliability. Specifically, when the medium is stored at elevated temperature, record marks crystallize more to invite drops of C/N and degree of modulation. Additionally, the deterioration of C/N and degree of modulation caused by repetitive recording is promoted.

If the value of a+b is too small, tellurium will become excessive to form a tellurium phase, which lowers the rate of crystal transition to hinder erasure. If the value of a+b is too large, it would become difficult to make the recording layer amorphous and it would become impossible to record signals.

If the value of c is too small in formula (II), change of reflectivity associated with a phase change will be sufficient, but erasure would be difficult due to markedly reduced rate of crystal transition. If the value of c is too large, change of reflectivity associated with a phase change will be insufficient to invite drop of degree of modulation.

The element M in formula II is at least one element selected from the group consisting of H, Si, C, V, W, Ta, Zn, Ti, Ce, Tb, Ge, Sn, Pb and Y. The element M is effective for improving rewriting durability, more specifically restraining the erasability from lowering as a result of repetitive rewriting. It is also effective for improving reliability under severe conditions such as hot humid conditions. At least one of V, Ta, Ce, Ge and Y is preferred among the elements M because their effects are more outstanding. V and/or Ta is more preferred, with V being the most preferred.

If the value of d which stands for the content of element M is too large, change of reflectivity associated with a phase change becomes too small to provide a sufficient degree of modulation. If the value of d is too small, effect of the addition of the element M will be insufficient.

Although it is preferred that the recording layer consists essentially of silver (Ag), antimony (Sb), tellurium (Te), indium (In), and optionally added M, it is acceptable that the silver is partially replaced by gold (Au); the antimony is partially replaced by bismuth (Bi); the tellurium (Te) is partially replaced by selenium (Se); and the indium (In) is partially replaced by aluminum (Al) and/or phosphorus (P).

The percent replacement of Ag by Au is preferably up to 50 at %, more preferably up to 20 at %. With a higher percent replacement, record marks are likely to crystallize, leading to a loss of reliability at elevated temperature.

The percent replacement of Sb by Bi is preferably up to 50 at %, more preferably up to 20 at %. With a higher percent replacement, the recording layer would have an increased coefficient of absorption. As a result, the optical interference effect and the difference in reflectivity between crystalline and amorphous regions are reduced, leading to a lower degree of modulation and a lower C/N.

The percent replacement of Te by Se is preferably up to 50 at %, more preferably up to 20 at %. With a higher percent replacement, the crystal transition would be retarded and the erasability be reduced.

The percent replacement of In by Al and/or P is preferably up to 40 at %, more preferably up to 20 at %. With a higher percent replacement, record marks would become less stable with a resultant loss of reliability. The proportion of Al and P is arbitrary.

The recording layer of this composition system preferably has a thickness of about 9.5 to 50 nm, and more preferably, a thickness of about 13 to 30 nm. A too thin recording layer would restrain the growth of a crystalline phase and provide an insufficient change of reflectivity associated with a phase change. A too thick recording layer would invite silver diffusion of an increased amount in the thickness direction of the recording layer upon formation of the recording mark which in turn results in the silver diffusion of a reduced amount in the direction of the recording layer, and the resulting recording layer would be less reliable. A too thick recording layer would also provide a lower reflectivity and a lower degree of modulation.

The composition of the recording layer is identifiable by electron probe microanalysis (EPMA), X-ray microanalysis, ICP etc.

The recording layer is preferably formed by sputtering. The conditions for the sputtering are not critical, and when a material containing two or more elements are sputtered, the sputtering may be effected by using an alloy target or by using simultaneous sputtering employing two or more targets.

Reflective layer 5

The reflective layer 5 may be formed from any desired material, and typically, the reflective layer 5 is formed from a metal of high reflectance such as Al, Au, Ag, Pt, Cu, Ni, Cr, or Ti as a simple substance or as an alloy containing at least one of such metals. The reflective layer is preferably about 30 to 300 nm thick. Reflectance will be insufficient with a thickness below this range. A thickness beyond this range will provide no substantial improvement in reflectance and add to the cost. The Reflective layer is preferably formed by vapor deposition such as sputtering and evaporation.

Protective layer 6

The protective layer 6 is provided for improving scratch resistance and corrosion resistance. Preferably, the protective layer is formed of an organic material, typically a radiation curable compound or a composition thereof which is cured with radiation such as electron and UV radiation. The protective layer is generally about 0.1 to 100 μm thick and may be formed by conventional techniques such as spin coating, gravure coating, spray coating, and dipping.

Adhesive layer

The adhesive used for the adhesive layer is not limited to any particular type, and the adhesive may be a hot melt adhesives, a UV curing adhesive, or a room temperature curing adhesive, or alternatively, a pressure sensitive adhesive.

Recording and reproduction

The optical recording medium of the present invention may be overwritten as in the case of the conventional optical recording medium of phase change type. However, it is preferable to use a laser beam of the modulation pattern as described below.

Figure 3:
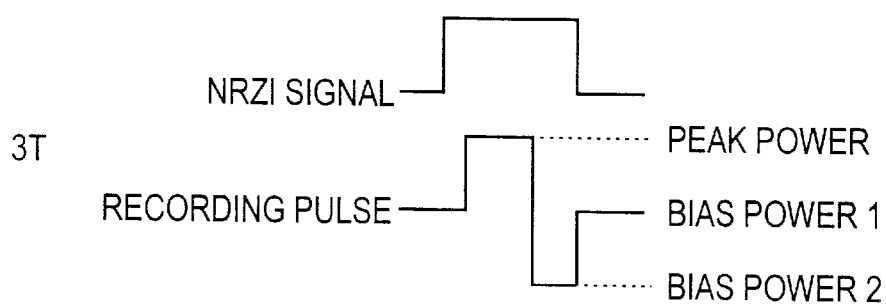
FIGS. 3A and 3B are graphs showing the modulation pattern of the laser beam used for overwriting the optical recording medium according to the present invention.
Figure 3:
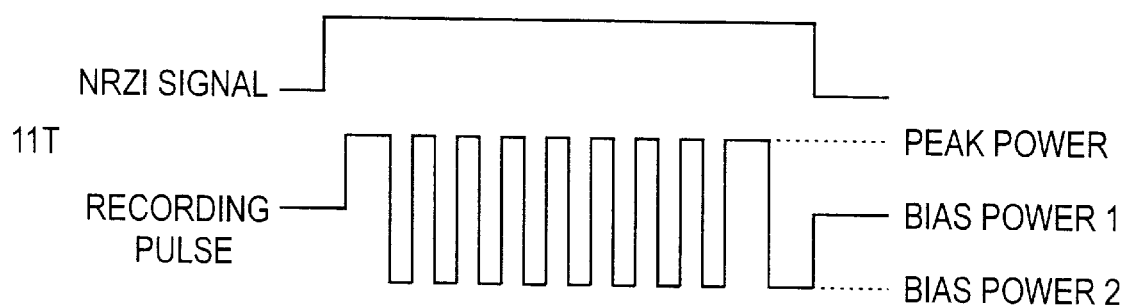

The modulation patterns of the laser beam preferable for use in the present invention are shown in FIGS. 3A and 3B. FIG. 3A shows the modulation pattern (pattern of the recording pulse) for recording with 3T signal, and FIG. 3B shows the modulation pattern for recording with 11T signal. In FIGS. 3A and 3B, time is shown in horizontal direction, and power level of the laser beam is shown in longitudinal direction. It should be noted that the patterns of NRZI signal for 3T and 11T are also shown in FIGS. 3A and 3B.

These modulation patterns utilize three power levels, namely, $P_P$ (peak power); $P_{B1}$ (bias power 1) lower than the $P_P$; and $P_{B2}$ (bias power 2) lower than the $P_{B1}$. Pulse modulation of the recording power is not novel in the art. However, in the conventional pulse modulation, the bottom value of the recording pulse was the erasing power $P_{B1}$. In contrast, the patterns of the present invention has the characteristic feature that the recording pulse is modulated between the peak value $P_P$ and the bottom value $P_{B2}$, and after the irradiation of the last pulse, the power level is reduced to the bottom value $P_{B2}$ and then increased to the erasing power level $P_{B1}$. By using the recording pulse of such pattern, deformation of record marks is prevented and increase of jitter can be suppressed even when the recording is conducted at a high density.

$P_P$, $P_{B1}$, and $P_{B2}$ vary with the conditions such as composition of the recording layer and linear velocity of the recording medium. However, $P_P$, $P_{B1}$, and $P_{B2}$ are generally selected from the ranges of 9 to 12 mW, 4 to 6 mW, and 0 to 2 mW, respectively.

In the overwriting of the optical recording medium of the invention, the linear velocity of the recording layer in relation to the laser beam is not limited to particular range. The linear velocity, however, is generally about 0.8 to 20 m/s, and preferably 1.2 to 16 m/s when the recording layer is of the composition as described above.

In the optical recording medium having the recording layer of the composition as described above, the light used for the overwriting and reproduction may be selected from a wide range of wavelength, for example, from the range of 100 to 5,000 nm.

EXAMPLES

Examples of the present invention are given below by way of illustration and not by way of limitation.

Examples

A disc shaped substrate 2 having a diameter of 120 mm and a thickness of 0.6 mm was prepared by injection molding polycarbonate. A groove was formed in one major surface of the substrate simultaneous with the injection molding. The groove had a width of 0.74 μm, a depth of 65 nm, and a pitch of 1.48 μm. On the grooved surface of the substrate, there were formed a first dielectric layer 31, a recording layer 4, a second dielectric layer 32, a reflective layer 5, and a protective layer 6 to produce the optical recording disc samples of the constitution as depicted in FIGS. 1 and 2.

The composition and the thickness of the dielectric layers constituting the first dielectric layer 31 and the second dielectric layer 32 are shown in Table 1. The composition and the thickness of the first dielectric layer of single layer constitution are shown in the column of the dielectric layer 1a in Table 1, and the composition and the thickness of the second dielectric layer of single layer constitution are shown in the column of the dielectric layer 2a in Table 1. Of the dielectric layers, those comprising ZnS—SiO$_2$, SiO$_2$, or CeO$_2$ were formed by sputtering in argon atmosphere, and those comprising Si$_3$N$_4$ or Ge$_3$N$_4$ were formed by reactive sputtering in a nitrogen-containing argon atmosphere by using a target comprising Ge or Si.

The recording layer 4 was formed by sputtering in argon atmosphere. The composition and the thickness of the recording layer is shown in Table 1.

The reflective layer 5 was formed by sputtering in argon atmosphere by using Al—1.7 at % Cr for the target. The reflective layer 5 was formed to a thickness of 150 nm.

The protective layer 6 was formed by applying a UV curable resin by spin coating and exposing it to UV for curing. The protective layer as cured had a thickness of 5 μm.

The thus produced samples were initialized by a bulk eraser. The crystal grain size of the recording layer after the initialization was about 100 nm. The initialized samples were then evaluated for their properties in the repeated overwriting operations on an optical recording medium evaluator at a wavelength of 638 nm, NA (numerical aperture) of 0.6, and a linear velocity of 6 m/s.

Recording pulse

Pulse pattern: The exemplary patterns shown in FIGS. 3A and 3B.

Recording power (peak power): 11.0 mW

Erasing power (bias power 1): 5.0 mW

Bottom power (bias power 2): 0.5 mW

The samples were measured for the number of overwritable operations. The number of overwritable operations was evaluated by determining maximum number of overwritable operations wherein jitter remained in the range of up to 13%. The jitter was measured in every 1000 overwriting operations. The results are shown in Table 1.

The samples were also evaluated for the exfoliation by utilizing the significant fluctuation in the reflectance which is associated with the exfoliation of the first dielectric layer. The samples were stored under the conditions of 60° C. and 80% RH for 50 hours, and determined for their reflectance to thereby determine the occurrence of exfoliation from the fluctuation in the reflectance. The results are shown in Table 1.

TABLE 1

| Sample No | Dielectric layer 1a ZnS:SiO$_2$ (mol %) | Thickness (nm) | Dielectric layer 1b Composition (mol %) | Thickness (nm) | Recording layer Ge:Sb:Te (atomic ratio) | Thickness (nm) |
|---|---|---|---|---|---|---|
| 1 | 85:15 | 65 | Si$_3$N$_4$ (100) | 20 | 1:2:4 | 20 |
| 2 | 85:15 | 65 | Si$_3$N$_4$ (100) | 20 | 1:2:4 | 20 |
| 3 | 85:15 | 65 | Si$_3$N$_4$ (100) | 20 | 1:2:4 | 20 |
| 4 | 85:15 | 90 | Si$_3$N$_4$ (100) | 5 | 21:25:54 | 22 |
| 5 | 85:15 | 92 | Si$_3$N$_4$ (100) | 3 | 21:25:54 | 22 |
| 6 | 85:15 | 95 | Si$_3$N$_4$ (100) | 1 | 21:25:54 | 22 |
| 7 | 85:15 | 95 | Ge$_3$N$_4$ (100) | 10 | 21:25:54 | 22 |
| 8 | 85:15 | 85 | Ge$_3$N$_4$ (100) | 20 | 21:25:54 | 22 |
| 9 | 85:15 | 75 | Ge$_3$N$_4$ (100) | 30 | 21:25:54 | 22 |
| 10 | 85:15 | 65 | Si$_3$N$_4$ (100) | 20 | 1:2:4 | 20 |
| 11 | 85:15 | 65 | Si$_3$N$_4$ (100) | 20 | 1:2:4 | 20 |
| 12 | 85:15 | 65 | Si$_3$N$_4$ (100) | 20 | 1:2:4 | 20 |
| 13 | 85:15 | 65 | Si$_3$N$_4$ (100) | 20 | 1:2:4 | 20 |
| 14 | 85:15 | 85 | Ge$_3$N$_4$ (100) | 20 | 21:25:54 | 20 |
| 15 | 85:15 | 85 | Ge$_3$N$_4$ (100) | 20 | 21:25:54 | 20 |
| 16 | 85:15 | 85 | Ge$_3$N$_4$ (100) | 20 | 21:25:54 | 20 |
| 17 | 85:15 | 85 | Ge$_3$N$_4$ (100) | 20 | 21:25:54 | 20 |
| 18** | 85:15 | 85 | — | — | 1:2:4 | 20 |
| 19** | 85:15 | 65 | Si$_3$N$_4$ (100) | 20 | 1:2:4 | 20 |
| 20** | 85:15 | 35 | Si$_3$N$_4$ (100) | 50* | 1:2:4 | 20 |

| Sample No. | Dielectric layer 2a Composition (mol %) | Thickness (nm) | Dielectric layer 2b Composition (mol %) | Thickness (nm) | Number of overwritable operations | Exfoliation at dielectric layer |
|---|---|---|---|---|---|---|
| 1 | ZnS:SiO$_2$ (85:15) | 20 | — | — | >100,000 | Yes |
| 2 | ZnS:SiO$_2$ (50:50) | 30 | — | — | >100,000 | Yes |
| 3 | SiO$_2$ (100) | 30 | — | — | >100,000 | Yes |
| 4 | ZnS:SiO$_2$ (50:50) | 30 | — | — | >100,000 | Yes |
| 5 | ZnS:SiO$_2$ (50:50) | 30 | — | — | >100,000 | No |
| 6 | ZnS:SiO$_2$ (50:50) | 30 | — | — | >100,000 | No |
| 7 | ZnS:SiO$_2$ (50:50) | 30 | — | — | >100,000 | No |
| 8 | ZnS:SiO$_2$ (50:50) | 30 | — | — | >100,000 | No |
| 9 | ZnS:SiO$_2$ (50:50) | 30 | — | — | >100,000 | No |
| 10 | ZnS:SiO$_2$ (85:15) | 5 | SiO$_2$ (100) | 20 | >100,000 | Yes |
| 11 | ZnS:SiO$_2$ (85:15) | 5 | CeO$_2$ (100) | 20 | >100,000 | Yes |
| 12 | ZnS:SiO$_2$ (50:50) | 5 | SiO$_2$ (100) | 25 | >100,000 | Yes |
| 13 | ZnS:SiO$_2$ (50:50) | 5 | CeO$_2$ (100) | 25 | >100,000 | Yes |
| 14 | ZnS:SiO$_2$ (85:15) | 5 | SiO$_2$ (100) | 20 | >100,000 | No |
| 15 | ZnS:SiO$_2$ (85:15) | 5 | CeO$_2$ (100) | 20 | >100,000 | No |
| 16 | ZnS:SiO$_2$ (50:50) | 5 | SiO$_2$ (100) | 25 | >100,000 | No |
| 17 | ZnS:SiO$_2$ (50:50) | 5 | CeO$_2$ (100) | 25 | >100,000 | No |
| 18** | ZnS:SiO$_2$ (85:15) | 20 | — | — | 1,000 | No |
| 19** | Si$_3$N$_4$* (100) | 40 | — | — | 10,000 | Yes |
| 20** | ZnS:SiO$_2$ (85:15) | 20 | — | — | 10,000 | Yes |

*outside the claimed scope
**comparative

The merit of the present invention is evident from the results shown in Table 1. The number of overwritable operations was in excess of 100,000 in all of the samples of the present invention (Sample Nos. 1 to 17) in contrast to Comparative Sample No. 18 wherein both the first and the second dielectric layers were constituted from ZnS and SiO$_2$ (ZnS:SiO$_2$=85:15, molar ratio); Comparative Sample No. 19 wherein Si3N$_4$ layers were formed on opposite sides of and in contact with the recording layer; and Comparative Sample No. 20 (corresponding to the Example of JP-A 195747/94, supra) wherein the dielectric layer 1b was thicker than the range of the present invention for the purpose of increasing the crystallization. The number of overwritable operations in these Comparative Samples was 10,000 or less. It is also apparent from Table 1 that, when the dielectric layer 1b comprises silicon nitride, exfoliation at the first dielectric layer is unlikely to occur when the first dielectric layer 1b is deposited to less than 5 nm, even when the medium is stored at a high temperature and high humidity.

Japanese Patent Application Nos. 284444/1997 and 364543/1997 are incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

We claim:

1. An optical recording medium having a substrate and a recording layer of phase change type wherein the recording layer has a first dielectric layer and a second dielectric layer disposed on opposite sides thereof and in contact therewith, and wherein a reflective layer comprising a metal is disposed on the second dielectric layer, wherein the first dielectric layer comprises a dielectric layer 1a on the side of the substrate and a dielectric layer 1b on the side of the recording layer, and the dielectric layer 1a contains zinc sulfide and silicon oxide as its main components and the dielectric layer 1b contains silicon nitride and/or germanium nitride as its main component(s);

the second dielectric layer contains zinc sulfide and silicon oxide; silicon oxide; or oxide of a rare earth metal as its main component(s); and the dielectric layer 1b has a thickness of 0.5 to 40 nm, and ratio ($t_{1b}/t_1$) of thickness ($t_{1b}$) of the dielectric layer 1b to the thickness ($t_1$) of the first dielectric layer is up to 0.5.

2. The optical recording medium according to claim 1 wherein the dielectric layer 1b contains silicon nitride as its main component, and the dielectric layer 1b has a thickness of less than 5 nm.

3. The optical recording medium according to claim 1 wherein the dielectric layer 1a has silicon oxide content in the range of from 2 mol % to less than 40 mol % (excluding 40 mol %) when the silicon oxide content is determined by calculating the zinc sulfide and the silicon oxide in terms of ZnS and $SiO_2$, respectively.

4. The optical recording medium according to claim 1 wherein the recording layer contains Ge, Sb and Te as its main components.

5. The optical recording medium according to claim 1 wherein the recording layer has an average crystal grain size of 20 to 150 nm.

6. A method for overwriting the optical recording medium of claim 1 wherein the medium is overwritten with a laser beam modulated in three power levels of $P_P$ (peak power); $P_{B1}$ (bias power 1) lower than the $P_P$; and $P_{B2}$ (bias power 2) lower than the $P_{B1}$; and the laser beam for the record mark formation is pulse modulated such that the peak power is $P_P$ and the bottom power is $P_{B2}$, and the power level is reduced to $P_{B2}$ after the irradiation of the last pulse and increased to the erasing power level of $P_{B1}$.

7. An optical recording medium having a substrate and a recording layer of phase change type wherein the recording layer has a first dielectric layer and a second dielectric layer disposed on opposite sides thereof and in contact therewith, and wherein a reflective layer comprising a metal is disposed on the second dielectric layer, wherein the first dielectric layer comprises a dielectric layer 1a on the side of the substrate and a dielectric layer 1b on the side of the recording layer, and the dielectric layer 1a contains zinc sulfide and silicon oxide as its main components and the dielectric layer 1b contains silicon nitride and/or germanium nitride as its main component(s);

the second dielectric layer comprises a dielectric layer 2a on the side of the recording layer and a dielectric layer 2b on the side of the reflective layer, and the dielectric layer 2a contains zinc sulfide and silicon oxide as its main components and the dielectric layer 2b contains silicon oxide or oxide of a rare earth metal as its main component; and the dielectric layer 1b has a thickness of 0.5 to 40 nm, and ratio ($t_{1b}/t_1$) of thickness ($t_{1b}$) of the dielectric layer 1b to the thickness ($t_1$) of the first dielectric layer is up to 0.5.

8. The optical recording medium according to claim 7 wherein the dielectric layer 1b contains silicon nitride as its main component, and the dielectric layer 1b has a thickness of less than 5 nm.

9. The optical recording medium according to claim 7 wherein the dielectric layer 1a has silicon oxide content in the range of from 2 mol % to less than 40 mol % (excluding 40 mol %) when the silicon oxide content is determined by calculating the zinc sulfide and the silicon oxide in terms of ZnS and $SiO_2$, respectively.

10. The optical recording medium according to claim 7 wherein the recording layer contains Ge, Sb and Te as its main components.

11. The optical recording medium according to claim 7 wherein the recording layer has an average crystal grain size of 20 to 150 nm.

12. A method for overwriting the optical recording medium of claim 7 wherein the medium is overwritten with a laser beam modulated in three power levels of $p_P$ (peak power); $P_{B1}$ (bias power 1) lower than the $P_P$; and $P_{B2}$ (bias power 2) lower than the $P_{B1}$; and the laser beam for the record mark formation is pulse modulated such that the peak power is $P_P$ and the bottom power is $P_{B2}$, and the power level is reduced to $P_{B2}$ after the irradiation of the last pulse and increased to the erasing power level of $P_{B1}$.

* * * * *

UNITED STATES PATENT AND TRADEMARK OFFICE
CERTIFICATE OF CORRECTION

PATENT NO. : 6,071,587

DATED : June 6, 2000

INVENTOR(S): Jiro YOSHINARI, et al.

It is certified that an error appears in the above-identified patent and that said Letters Patent is hereby corrected as shown below:

Column 17, line 15, "silicon oxide content is determined" should read --silicon oxide content $[SiO_2/(ZnS + SiO_2)]$ is determined--.

Column 18, line 23, "silicon oxide content is determined" should read --silicon oxide content $[SiO_2/(ZnS + SiO_2)]$ is determined--.

Signed and Sealed this

Twenty-second Day of May, 2001

Attest:

NICHOLAS P. GODICI

Attesting Officer     Acting Director of the United States Patent and Trademark Office